United States Patent [19]

Watanabe et al.

[11] 4,160,744

[45] Jul. 10, 1979

[54] CATALYST FOR REDUCTION OF NITROGEN OXIDES AND METHOD FOR MANUFACTURE THEREOF

[75] Inventors: Akira Watanabe; Tetsuya Sugimoto, both of Okayama; Yasuhiro Makino, Bizen, all of Japan

[73] Assignee: Kyushu Refractories Co., Ltd., Bizen, Japan

[21] Appl. No.: 883,842

[30] Foreign Application Priority Data

Jun. 10, 1977 [JP] Japan ............... 52-67781

[22] Filed: Mar. 6, 1978

[51] Int. Cl.$^2$ ................ B01J 21/02; B01J 23/74; B01J 27/02

[52] U.S. Cl. ................ 252/440; 252/466 J; 423/213.5; 423/239

[58] Field of Search ............. 252/440, 466 J; 423/213.5, 239, 239 A; 427/215

[56] References Cited

U.S. PATENT DOCUMENTS

| | | | |
|---|---|---|---|
| 3,993,731 | 11/1976 | Morikawa et al. | 423/239 A |
| 4,093,561 | 6/1978 | Nishikawa et al. | 252/466 J |

*Primary Examiner*—W. J. Shine
*Attorney, Agent, or Firm*—Stevens, Davis, Miller & Mosher

[57] ABSTRACT

Disclosed is a substance which is obtained by coating the surface of a specific iron-containing substance, through a specific procedure, with a material composed mainly of aluminum sulfate. The substance thus produced is useful as a catalyst for the removal of nitrogen oxides from an exhaust gas.

11 Claims, No Drawings

CATALYST FOR REDUCTION OF NITROGEN OXIDES AND METHOD FOR MANUFACTURE THEREOF

FIELD OF THE INVENTION

This invention relates to a catalyst which is used in reducing nitrogen oxides (hereinafter referred to as $NO_x$) present in an exhaust gas so as to permit the $NO_x$ to be removed in the reduced form from the exhaust gas and to a method for the manufacture of the catalyst.

BACKGROUND OF THE INVENTION

Generally, exhaust gases emanating from the so-called stationary pollution sources such as boilers and heating furnaces contain ecologically noxious $NO_x$ and, in this respect, constitute origins of air pollution. Establishment of a method capable of effective removal of $NO_x$ from such exhaust gases, therefore, is an urgent need.

Numerous studies have been conducted in search of methods for the removal of nitrogen oxides from exhaust gases and various methods have consequently been suggested. Of these methods, the most promising is the method of selective-contact reduction which causes the $NO_x$ to react with ammonia in the presence of a catalyst and, therefore, converts the $NO_x$ into $N_2$ and $H_2O$ which are both harmless ecologically. It is said that the treatment of an exhaust gas by this particular method entails substantially no operational problem where the exhaust gas happens to be a so-called clean gas essentially free from sulfur oxides (hereinafter referred to as $SO_x$) and dust. In the event that the exhaust gas happens to be a so-called dirty gas containing appreciable amounts of $SO_x$ and dust, however, this method suffers from a serious problem. To be specific, when the exhaust gas under treatment is a dirty gas, the catalyst being used in the treatment is poisoned by $SO_x$ and, consequently, the treatment is prevented from providing desired removal of $NO_x$ satisfactorily over a long period of time. To cope with the difficulty, there has been devised a measure whereby the catalyst so poisoned is moved to a separate place, there to be given a treatment for required regeneration. This measure, however, entails use of facilities complicated in mechanism and expensive to operate. For this reason, various studies have been made with a view to providing a catalyst capable of promoting the reduction of $NO_x$ for a long period of time without adverse affect by the coexistence of $SO_x$ in the exhaust gas under treatment. To this date, no satisfactory catalyst has yet been developed.

SUMMARY OF THE INVENTION

The present invention has been accomplished in the light of the state of affairs described above. It is, therefore, an object of the present invention to provide a catalyst which, in the removal of $NO_x$ from an exhaust gas by contact reduction of $NO_x$ with ammonia, enables desired removal of $NO_x$ from the exhaust gas to be continued at a high level of conversion in a wide temperature range for a long period of time without being adversely affected by the particular composition of exhaust gas due to the presence or absence of $SO_x$, the concentration of $NO_x$ itself, etc. and to a method for the manufacture of the catalyst.

This and other objects of the present invention will become apparent from the following description of this invention.

We have conducted research with a view to providing a catalyst as described above and have, consequently, arrived at a discovery that a product obtained by coating the surface of a specific iron-containing substance with a material composed predominantly of aluminum sulfate makes an ideal catalyst meeting the aforementioned requirements, possesses an ability to resist the $SO_x$ poisoning and retains its high activity over a long period of time.

According to the present invention, there is provided a catalyst for the reduction of $NO_x$, which catalyst includes a specific iron-containing substance having the surface thereof coated with a material composed mainly of aluminum sulfate and has an iron content of from 25 to 80% by weight as $Fe_2O_3$. The invention further provides a method for the manufacture of the catalyst for $NO_x$ reduction, which method includes coating the surface of the iron-containing substance, through a specific procedure, with the material composed mainly of aluminum sulfate.

DETAILED DESCRIPTION OF THE INVENTION

The catalyst of the present invention is obtained by coating a specific iron-containing substance as described below with a material composed mainly of aluminum sulfate. This catalyst has an iron content of from 25 to 80%, preferably from 35 to 60%, by weight as $Fe_2O_3$. The iron-containing substance used in the present invention is selected from the group consisting of iron hydroxide, ores composed mainly of iron hydroxide and products obtained by calcining these materials at a temperature not exceeding 700° C. the calcination temperature may be within the range of from 300° C. to 700° C. In this invention, these iron-containing substances may be used in the form of combinations of two or more members. Examples of suitable ores include limonite, lepidocrocite goethite, etc. If the temperature at which the product of the calcination is obtained exceeds 700° C., the catalyst eventually prepared by using this product fails to acquire ample activity. Thus, the temperature of the calcination must be not more than 700° C., and is preferably in the range of from 300° C. to 600° C. The material described above as being composed mainly of aluminum sulfate is one in which $Al_2(SO_4)_3$ accounts for not less than 60% of its total weight. If the $Al_2(SO_4)_3$ content is less than this value, the catalyst produced offers insufficient resistance to the $SO_x$ poisoning. As is evident from the subsequent description of the procedure for manufacture of the catalyst, the coating of the iron-containing substance with a material composed mainly of aluminum sulfate is not meant as covering the entire mass of substance with one overall coat but as covering the individual particles of the substance, each with an independent coat. Conceivably during the process of manufacture, part of the sulfate radical may seem to react with iron or an impure component present in the substance to form, in part, the corresponding sulfate. It has nevertheless been ascertained by X-ray diffraction and other similar methods that the sulfate radical exists substantially completely in the form of aluminum sulfate in the product consequently obtained. In the catalyst of this invention, the iron content is from 25 to 80%, preferably from 35 to 60%, by weight as $Fe_2O_3$. If the iron content is less than 25% by weight, the catalyst does not have sufficient activity for fulfilling the purpose of this invention. If the iron content exceeds 80% by weight, the catalyst has an insufficient aluminum sulfate content for providing a preferred level of resistance to the $SO_x$ poisoning and, thus, does not serve its purpose advantageously in the treatment of a dirty gas.

Now, the method by which the catalyst of the present invention for use in the reduction of nitrogen oxides is manufactured will be described.

(1) An aqueous solution containing 2 to 30% by weight (calculated as anhydrous salt) of at least one water-soluble aluminum salt selected from the group consisting of aluminum sulfate, ammonium aluminum sulfate, aluminum nitrate, aluminum chloride, aluminum formate, aluminum oxalate and aluminum acetate is prepared and 0.1 to 0.8 part by weight of the specific iron-containing substance (having a particle size of not more than 100μ) is mixed by agitation with 1 to 4 parts by weight of the aqueous solution.

(2) To the mixture thus obtained, a neutralizing agent is added so that aluminum hydroxide is formed on the surface of the iron-containing substance. The neutralizing agent used in this case is only required to be capable of reacting with the water-soluble aluminum salt in the mixture and consequently produce aluminum hydroxide. Examples of neutralizing agents usable for this purpose include ammonium hydroxide, ammonium carbonate, ammonium bicarbonate and urea. The amount of the neutralizing agent so added has only to be sufficient to cause the required precipitation of aluminum hydroxide.

(3-1) The liquid mixture (containing a sulfate and the iron-containing substance now coated with aluminum hydroxide) obtained in the stage of process (2) is evaporated to dryness when either aluminum sulfate or ammonium aluminum sulfate has been used as the source of aluminum.

(3-2) Where the source of aluminum is at least one water-soluble aluminum salt selected from the group consisting of aluminum nitrate, aluminum sulfate, ammonium aluminum sulfate, aluminum chloride, aluminum formate, aluminum oxalate and aluminum acetate, the liquid mixture obtained in the stage of process (2) described above is washed several times with a deionized water, then dehydrated and thereafter evaporated to dryness. A dry substance is consequently obtained. Then, a sulfate having a decomposition temperature not exceeding 600° C. is thoroughly mixed with the dry substance in an amount sufficient to convert at least 60% by weight of all the aluminum hydroxide contained in the dry substance into aluminum sulfate. Examples of sulfates which may be used for the conversion include ammonium sulfate and ammonium bisulfate.

(4) The solid substance obtained in consequence of the preceding process steps is finely pulverized, mixed homogeneously, shaped in a desired form and baked at a temperature not exceeding 800° C. A suitable range for the baking temperature is 400° C. to 800° C.

In the manufacture of the catalyst described above, the sulfate radical reacts with aluminum hydroxide to form aluminum sulfate as a secondary product during the stage of baking. If the temperature of this baking exceeds 800° C., however, the secondarily produced aluminum sulfate undergoes decomposition. The catalyst consequently produced, therefore, offers deficient resistance to $SO_x$ poisoning and manifests degraded activity. For this reason, the temperature of baking must be not more than 800° C., preferably in the range of from 450° C. to 750° C.

The catalyst of this invention remains unpoisoned by $SO_x$ and exhibits high activity in a relatively wide temperature range because the surfaces of the iron oxide particles which are believed to constitute the main active component of the catalyst are coated with a material composed mainly of aluminum sulfate. When this catalyst is used for reducing $NO_x$ present in a given exhaust gas and consequently removing $NO_x$ from the exhaust gas, the operation can be stably continued for a long period of time unaffected by the presence or absence of $SO_x$ in the exhaust gas under treatment.

This invention will now be described more specifically with reference to the following working examples.

The ratio of $NO_x$ removal as indicated in the examples and comparison examples cited herein below represents the value calculated in accordance with the following formula:

$$(1 - \frac{NO_x \text{ concentration at the outlet of catalyst bed}}{NO_x \text{ concentration at the inlet of catalyst bed}}) \times 100 \, (\%)$$

The catalysts conforming to the present invention which were used in the working examples had average pore radii ranging from 100 to 800 Å, pore volumes ranging from 0.1 to 0.6 cc/g and specific surface areas ranging from 5 to 80 m²/g.

EXAMPLE 1

In 8 liters of an aqueous solution containing 1480 g (0.54 mol/liter) of $Al_2(SO_4)_3$, 700 g of finely pulverized limonite (having a $Fe_2O_3$ content of 73% by weight) having particle diameters not exceeding 100μ was agitated. While the resultant liquid mixture was kept at 80° C. by heating, an aqueous 3N ammonia solution was added thereto until the pH value thereof reached 7 so as to induce precipitation of aluminum hydroxide. The mixture was then agitated and left to stand at that temperature for one hour.

The mixture solution which was consequently obtained was dried at 110° C. The dry substance was pulverized to particles of diameters less than 100μ, mixed and kneaded with added water, pelletized and dried and, thereafter molded in the form of tablets 3.5 mm in diameter and 3.5 mm in height. The tablets were baked at 650° C. for one hour to produce Catalyst A.

Catalysts B through G were obtained by repeating the same procedure as followed in the preparation of Catalyst A, except varying the concentration of the aqueous solution of aluminum sulfate and the amount of limonite to be added. The amounts of aluminum sulfate and those of limonite used in their preparation were as shown below:

| | Concentration (amount of aluminum sulfate) | | Amount of limonite |
|---|---|---|---|
| B | 0.44 mol/liter in 8 liters of | (1260 g contained aqueous solution) | 800 g |
| C | 0.34 mol/liter in 8 liters of | (932 g contained aqueous solution) | 900 g |
| D | 0.23 mol/liter in 8 liters of | (630 g contained aqueous solution) | 1050 g |
| E | 0.11 mol/liter in 8 liters of | (301 g contained aqueous solution) | 1200 g |
| F | 0.62 mol/liter | (1700 g contained | 400 g |

-continued

| | Concentration (amount of aluminum sulfate) in 8 liters of aqueous solution) | Amount of limonite |
|---|---|---|
| G | 0.04 mol/liter (110 g contained in 8 liters of aqueous solution) | 1735 g |

These catalysts were tested for activity. The results of this test are shown in Table 1 below.

Used in this test was a reaction tube having an inside diameter of 30 mm and made of stainless steel. Each catalyst as used in a fixed volume of 12.5 ml and the test gas was fed at a space velocity of 20,000 hr$^{-1}$. The gas was composed of 3.5% by volume of $O_2$, 15% by volume of $CO_2$, 400 ppm of NO, 500 ppm of $NH_3$ (on dry gas basis), 15% by volume of $H_2O$ (on wet gas basis) and the balance of $N_2$.

Table 1

| Catalyst | Reaction temperature Percentage of $NO_x$—removal (%) | | | | | Catalyst composition $Fe_2O_3$—$Al_2(SO_4)_3$ | | Remarks |
|---|---|---|---|---|---|---|---|---|
| | 250° C. | 300° C. | 350° C. | 400° C. | 450° C. | | | |
| A | 45 | 75 | 89 | 94 | 96 | 29% by weight | 60% by weight | Working example |
| B | 61 | 80 | 93 | 95 | 97 | 36% by weight | 53% by weight | Working example |
| C | 68 | 92 | 98 | 99 | 99 | 47% by weight | 42% by weight | Working example |
| D | 72 | 95 | 98 | 99 | 99 | 55% by weight | 33% by weight | Working example |
| E | 73 | 95 | 98 | 99 | 99 | 7% by weight | 17% by weight | Working example |
| F | 30 | 53 | 68 | 72 | 75 | 18% by weight | 70% by weight | Comparison example |
| G | 71 | 95 | 97 | 99 | 99 | 83% by weight | 6% by weight | Comparison example |

Then, the catalysts were tested for degradation by $SO_x$ by determining their resistance to $SO_x$ as indicated below. The same reaction tube as mentioned above was packed with the fixed quantity of 12.5 ml of each catalyst. A mixed gas composed of 2.0% by volume of $SO_2$, 0.3% by volume of $NH_3$, 10% by volume of $O_2$, 15% by volume of $H_2O$ and the balance of $N_2$ was passed through the reaction tube, with the catalyst bed temperature fixed at 400° C. and the space velocity at 5,000 hr$^{-1}$. At intervals of 5 hours, the catalyst was tested for the removal of $NO_x$ under the aforementioned activation conditions. The results of the test conducted on Catalysts A through G for resistance to $SO_x$ are shown in Table 2 below.

Table 2

| Catalyst | Lapse of time (hours) Percentage of $NO_x$—removal (%) | | | | | | | | Remarks |
|---|---|---|---|---|---|---|---|---|---|
| | 5 | 10 | 15 | 20 | 50 | 100 | 200 | 500 | |
| A | 93 | 92 | 92 | 92 | 91 | 91 | 91 | 91 | Working example |
| B | 95 | 95 | 94 | 93 | 93 | 93 | 93 | 93 | Working example |
| C | 98 | 98 | 98 | 97 | 97 | 96 | 97 | 96 | Working example |
| D | 98 | 97 | 97 | 96 | 96 | 96 | 96 | 96 | Working example |
| E | 97 | 97 | 95 | 95 | 95 | 94 | 93 | 93 | Working example |
| F | — | — | — | — | — | — | — | — | Comparison example |
| G | 98 | 94 | 90 | 86 | 79 | — | — | — | Comparison example |

As is evident from Table 1 and Table 2, Catalysts A, B, C, D and E exhibited a high percentage of $NO_x$-removal in wide temperature ranges and, also in the test for resistance to $SO_x$, retained high percentage of $NO_x$-removal for long periods of time. The data indicate that these catalysts excelled in resistance to $SO_x$ poisoning.

In contrast, Catalyst F which had a smaller $Fe_2O_3$ content failed to show a satisfactory percentage of $NO_x$-removal. Catalyst G which had a $Fe_2O_3$ content of 83% by weight showed a high percentage of $NO_x$-removal but, in the test for resistance to $SO_x$, had the percentage of $NO_x$-removal degraded in a relatively short period of time, indicating that its resistance to $SO_x$ poisoning was inferior.

EXAMPLE 2

In 8 liters of an aqueous solution containing 904 g (0.33 mol/liter) of $Al_2(SO_4)_3$, 875 g of finely pulverized limonite having particle diameters not exceeding 100μ was mixed. While the resultant liquid mixture was kept at 80° C. by heating, an aqueous 3N ammonia solution was added thereto until the pH value thereof reached 7 so as to induce precipitation of aluminum hydroxide. The mixture was then agitated and left to stand at that temperature for one hour. The resultant mixed solution was dehydrated by a centrifugal separator and then dried to produce a solid substance having a water content of about 70%. This solid substance was dried at 110° C., pulverized to particles of diameters not exceeding 100μ, mixed with 800 g of ammonium sulfate, mixed further with added water, kneaded, pelletized and then adjusted to a suitable water content and thereafter compression molded into tablets 3.5 mm in diameter and 3.5 mm in height. The tablets were baked at 650° C. for one hour to afford produce Catalyst H.

Comparison Example 1

The substance obtained through the steps of dehydration, desiccation and pulverization in Example 2 was processed by repeating the procedure of Example 2, except omitting the addition of ammonium sulfate. Thus was obtained Catalyst I.

Catalysts H and I were tested for activity. The results of this test are shown in Table 3. They were further tested for resistance to $SO_x$ poisoning. The results are shown in Table 4.

Table 3

| Catalyst | Reaction temperature Percentage of $NO_x$—removal (%) | | | | | Catalyst composition $Fe_2O_3$—$Al_2(SO_4)_3$ | | Remarks |
|---|---|---|---|---|---|---|---|---|
| | 250° C. | 300° C. | 350° C. | 400° C. | 450° C. | | | |
| H | 70 | 93 | 96 | 98 | 99 | 43% by weight | 48% by weight | Working example |
| I | 68 | 90 | 96 | 98 | 98 | 60% by weight | 12% by weight | Comparison example |

Table 4

| Catalyst | Lapse of time (hrs) Percentage of $NO_x$—removal (%) | | | | | | | | Remarks |
|---|---|---|---|---|---|---|---|---|---|
| | 5 | 10 | 15 | 20 | 50 | 100 | 200 | 500 | |
| H | 98 | 98 | 97 | 97 | 97 | 97 | 97 | 96 | Working example |
| I | 97 | 95 | 91 | 86 | 77 | — | — | — | Comparison example |

As is evident from Tables 3 and 4, Catalyst H which was prepared by adding to the substance resulting from the steps of dehydration and desiccation such an amount of ammonium sulfate as to give rise to a prescribed concentration of aluminum sulfate exhibited excellent results in the test for activity and the test for resistance to $SO_x$ poisoning. In contrast, Catalyst I which did not incorporate any ammonium sulfate and, consequently, did not contain the prescribed concentration of aluminum sulfate was demonstrated to be inferior in its resistance to $SO_x$ poisoning.

EXAMPLE 3

In 8 liters of an aqueous solution containing 1206 g (0.44 mol/liter) of $Al_2(SO_4)_3$, 824 g of ferric hydroxide (Fe(OH)$_3$) pulverized to a particle size of about 30μ was agitated. The resultant mixture was processed by repeating the procedure of Example 1, to afford Catalyst J.

EXAMPLE 4

In 8 liters of an aqueous solution containing 1206 g (0.44 mol/liter) of $Al_2(SO_4)_3$, 700 g of limonite (having a $Fe_2O_3$ content of 92.5% by weight) calcined at 400° C. and pulverized into particles of diameters not exceeding 50μ was agitated. The resultant mixture was processed thereafter by repeating the procedure of Example 1, to afford Catalyst K.

Comparison Example 2

In 8 liters of an aqueous solution containing 1206 (0.44 mol/liter) of $Al_2(SO_4)_3$, 700 g of limonite calcined at 800° C. and pulverized into particles of diameters not exceeding 50μ (having a $Fe_2O_3$ content of 93.0% by weight) was agitated. The resultant mixture was processed thereafter by repeating the procedure of Example 1, to afford Catalyst L.

Table 5

| Catalyst | Reaction temperature Percentage of $NO_x$—removal (%) | | | | | Catalyst composition $Fe_2O_3$—$Al_2(SO_4)_3$ | | Remarks |
|---|---|---|---|---|---|---|---|---|
| | 250° C. | 300° C. | 350° C. | 400° C. | 450° C. | | | |
| J | 69 | 89 | 96 | 99 | 99 | 39% by weight | 55% by weight | Working example |
| K | 67 | 90 | 96 | 99 | 99 | 38% by weight | 52% by weight | Working example |
| L | 24 | 44 | 53 | 60 | 62 | 39% by weight | 52% by weight | Comparison example |

Table 6

| Catalyst | Lapse of time (hours) Percentage of $NO_x$—removal (%) | | | | | | | | Remarks |
|---|---|---|---|---|---|---|---|---|---|
| | 5 | 10 | 15 | 20 | 50 | 100 | 200 | 500 | |
| J | 99 | 98 | 95 | 96 | 96 | 95 | 96 | 95 | Working example |
| K | 99 | 98 | 98 | 98 | 97 | 97 | 97 | 96 | Working example |
| L | — | — | — | — | — | — | — | — | Comparison example |

It is evident from Table 5 and Table 6 that Catalysts J and K which used ferric hydroxide and limonite calcined at 400° C. respectively as the raw materials for iron oxide to be added to the aqueous solution containing $Al_2(SO_4)_3$ exhibited satisfactorily high percentages of $NO_x$-removal, while Catalyst L which used limonite calcined at 800° C. showed a low percentage of $NO_x$-removal in spite of the fact that it had a $Fe_2O_3$ content of 39% by weight and an $Al_2(SO_4)_3$ content of 52% by weight.

What is claimed is:

1. A catalyst for use in the reduction of nitrogen oxides; which comprises (1) at least one iron-containing substance selected from the group consisting of iron hydroxides, ores having iron hydroxide as their principal component and products obtained by calcining said hydroxides and ores at a temperature not exceeding 700° C. and (2) a material composed mainly of aluminum sulfate, the surface of said iron-containing substance being coated with said material, and said catalyst having an iron content of from 25 to 80% by weight as $Fe_2O_3$.

2. The catalyst according to claim 1, wherein said ore is limonite, lepidocrocite or goethite.

3. The catalyst according to claim 1, wherein the temperature at which said product of calcination is obtained is in the range of from 300° C. to 700° C.

4. The catalyst according to claim 1, wherein said material composed mainly of aluminum sulfate has an aluminum sulfate content of at least 60% by weight.

5. A method for the manufacture of a catalyst for use in the reduction of nitrogen oxides, which method comprises the steps of:
(a) mixing 1 to 4 parts by weight of an aqueous solution containing 2 to 30% by weight (calculated as anhydrous salt) of aluminum sulfate or ammonium aluminum sulfate with 0.1 to 0.8 part by weight of at least one iron-containing substance having particle diameters not exceeding 100μ and selected from the group consisting of iron hydroxides, ores containing iron hydroxide as their principal component and products obtained by calcining said hydroxides and ores at a temperature not exceeding 700° C.;
(b) adding a neutralizing agent to the resultant mixture thereby coating the surface of said iron-containing substance with aluminum hydroxide formed in consequence of the resultant neutralization;
(c) evaporating to dryness the liquid mixture obtained in consequence of the step (b), which contains a sulfate and the iron-containing substance coated with aluminum hydroxide; and
(d) molding the resultant solid substance in a desired form, subsequently baking the molded product at a temperature not exceeding 800° C. thereby converting the aluminum hydroxide deposited on the surface into aluminum sulfate.

6. A method for the manufacture of a catalyst for use in the reduction of nitrogen oxides, which method comprises the steps of:
(a) mixing 1 to 4 parts by weight of an aqueous solution containing 2 to 30% by weight (calculated as anhydrous salt) of at least one water-soluble aluminum salt selected from the group consisting of aluminum nitrate, aluminum sulfate, ammonion aluminum sulfate, aluminum chloride, aluminum formate, aluminum oxalate and aluminum acetate with 0.1 to 0.8 part by weight of at least one iron-containing particulate substance having a particle diameter not exceeding 100μ and selected from the group consisting of iron hydroxides, ores containing iron hydroxide as their principal component and products obtained by calcining said hydroxides and ores at a temperature not exceeding 700° C.;
(b) neutralizing the resultant mixture thereby coating the particle surfaces of said iron-containing substance with aluminum hydroxide;
(c) washing the coated particulate material resulting from the step (b) with water and drying same;
(d) mixing the dry substance resulting from the step (c) with a sulfate salt having a decomposition temperature of not more than 600° C.; and
(e) molding the result mixture in a desired form and thereafter baking the molded mixture at a temperature not exceeding 800° C. thereby converting the aluminum hydroxide in the particle coatings into aluminum sulfate.

7. The method according to claim 6, wherein said sulfate salt having a decomposition temperature not exceeding 600° C. is ammonium sulfate or ammonium bisulfate.

8. The method according to claim 5 or 6, wherein said iron-containing substance is limonite, lepidocrocite or goethite.

9. The method according to claim 5 or 6, wherein the temperature at which the product of calcination is obtained is in the range of from 300° C. to 700° C.

10. The method according to claim 5 or 6, wherein said neutralizing is by addition of ammonium hydroxide, ammonium carbonate, ammonium bicarbonate or urea.

11. The method according to claim 5 or 6, wherein the baking temperature for converting the aluminum hydroxide into aluminum sulfate is in the range of from 400° C. to 800° C.

* * * * *